United States Patent [19] [11] 3,984,652
Graville [45] Oct. 5, 1976

[54] METHOD OF BUTT WELDING
[75] Inventor: Brian Anthony Graville, Baie d'Urfe, Canada
[73] Assignee: Dominion Bridge Company, Limited, Montreal, Canada
[22] Filed: Dec. 23, 1974
[21] Appl. No.: 536,040

[30] Foreign Application Priority Data
Oct. 30, 1974 Canada ............................ 212649

[52] U.S. Cl. .............................. 219/73; 219/137 R; 228/175; 228/191; 228/227
[51] Int. Cl.² ........................................ B23K 9/18
[58] Field of Search ............... 219/73, 76, 137, 118; 228/175, 191, 227, 231

[56] References Cited
UNITED STATES PATENTS

| | | | |
|---|---|---|---|
| 2,158,799 | 5/1939 | Larson | 219/76 |
| 2,812,419 | 11/1957 | Chyle | 219/118 |
| 2,830,169 | 4/1958 | Medicus | 219/118 X |
| 3,210,520 | 10/1965 | Arnold et al. | 219/137 R X |
| 3,558,846 | 1/1971 | Ujiie | 219/76 |
| 3,602,688 | 8/1971 | Sibley | 219/137 R |
| 3,625,757 | 12/1971 | Wiehe et al. | 219/73 X |
| 3,665,143 | 5/1972 | Ujiie | 219/76 |
| 3,745,322 | 7/1973 | Ito et al. | 219/137 WM |

Primary Examiner—J. V. Truhe
Assistant Examiner—N. D. Herkamp
Attorney, Agent, or Firm—Larson, Taylor and Hinds

[57] ABSTRACT

A method of butt welding two adjoining plates is disclosed. The method includes welding the two plates together in a single pass, cutting a gap in the center of the first weld leaving first weld material on the two adjoining surfaces, and then rewelding the gap between the two adjoining surfaces of first weld material ensuring the reweld only occurs on the first weld material. This method has the advantage of heat treating the heat affected zone (HAZ) of the parent material adjacent the weld to prevent adverse metallurgical effect on the metal.

10 Claims, 3 Drawing Figures

METHOD OF BUTT WELDING

This invention relates to a method of butt welding two plates together, and more particularly, to a method of butt welding using at least two weld passes that produce improved properties in the welded joint.

During the welding of metals, the material adjacent to the weld, sometimes referred to as the heat affected zone (HAZ), is affected from the thermal cycle caused during the welding step, and this has an adverse metallurgical effect on the metal to weaken it and cause other changes. For example, the affected zone of an electroslag weld usually suffers considerable grain growth, and as a consequence, marked deterioration in the impact properties of the heat affected zone are encountered. Generally, the damaging effect of this thermal cycle in the heat affected zone is less with welding processes having lower heat inputs. Furthermore, processes in which more than one weld pass is used to complete a weld derive benefit from the heat effect of subsequent passes. Thus, multi-pass welds made with low heat input generally have good properties.

Single pass high-heat input welding processes such as electroslag and electrogas may suffer a deterioration of toughness in the heat affected zone and usually require a complete heat treatment or normalizing of the weld after completion in order to restore the properties of the metal in the heat affected zone. To avoid having to carry out this heat treatment or normalizing process, it has been the practice to use multiple pass welding techniques. One such technique is shown in U.S. Pat. No. 3,210,520 issued Oct. 5, 1965, to Arnold et al, and involves a vertical welding multiple pass electrogas process in which specially shaped shoes are used to control the size of the pass being deposited in the weld area. At least one disadvantage occurs with the method shown in the patent, and others similar, in that the heat affected zone of the final weld pass does not receive any beneficial heat treatment and particularly if this pass is a high energy weld pass, it suffers some deterioration of toughness.

Other methods of avoiding the deterioration of toughness in the heat affected zone are by using the concept referred to as buttering or coating. This involves laying a coating of weld material onto the surface of the plate to be welded and then subsequently having another weld pass laid on the buttered surfaces. Such a process is shown in U.S. Pat. No. 3,745,322 issued on July 10, 1973, to Ito et al.

It is an object of the present invention to provide a method of butt welding two plates together by a means of a multi-pass weld that retains good properties in the heat affected zone adjacent the weld.

It is another object of the present invention to provide a method of making a weld which avoids the deterioration of properties in the heat affected zone adjacent the weld using only conventional welding equipment.

According to the present invention there is provided a method of butt welding two adjoining plates comprising the steps of first welding the two plates together in a single pass, cutting a gap in the centre of the first weld, leaving first weld material on the two adjoining surfaces and rewelding the gap between the two adjoining surfaces of first weld material ensuring the reweld only occurs on the first weld material.

In drawings which illustrate embodiments of the invention:

Figure 1:
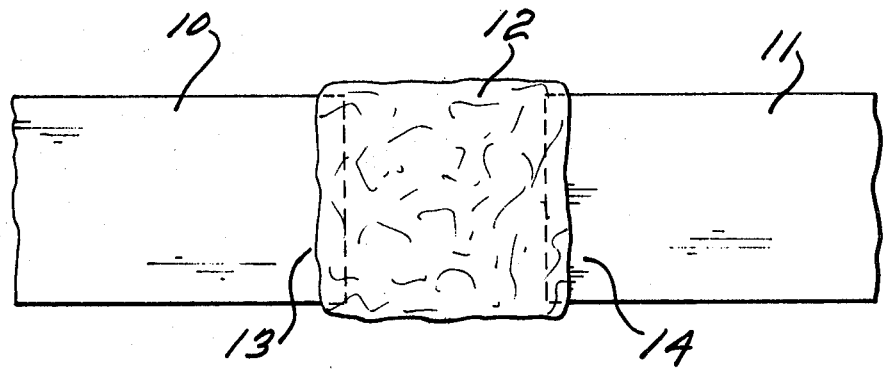
FIG. 1 illustrates diagrammatically a first weld between two plates.
Figure 2:
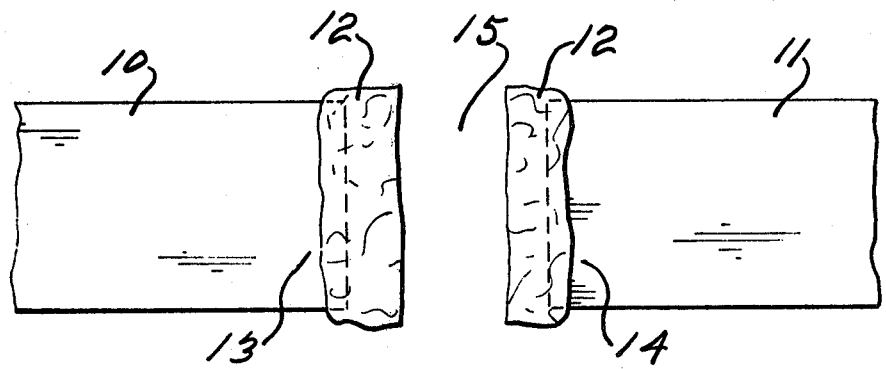
FIG. 2 illustrates diagrammatically a cut in the first weld of FIG. 1.
Figure 3:
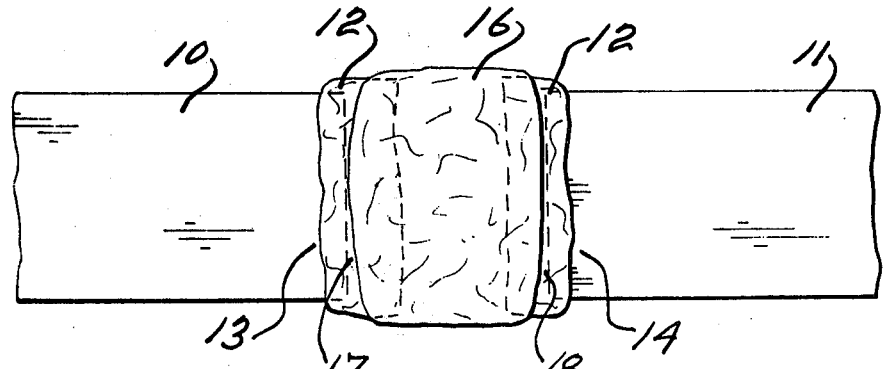
FIG. 3 illustrates diagrammatically a second weld over the weld cut of FIG. 2.

Referring now to the drawings, the ends of two plates 10 and 11 are shown in spaced apart relationship having a first complete butt weld 12 joining the two plates together. The heat affected zone (HAZ) 13 of the first plate 10 and the heat affected zone (HAZ) 14 of the second plate 11 are shown adjacent the first weld 12. These zones suffer a marked deterioration in the impact properties of the metal upon welding, and in order to improve the properties of these zones, must be heat treated in some manner to overcome this deterioration. The first weld 12 is deposited in one pass between the ends of the two plates 10 and 11 which are spaced apart an appropriate amount. In one embodiment, this gap is set to about 1½ inches. Electroslag and electrogas welding processes are particularly suitable and more particularly the consumable nozzle electroslag method has been used very successfully with depositing a weld between two such plates. A weld gap 15 is then cut through the first weld 12 as illustrated in FIG. 2. A sufficient amount of metal from the first weld 12 remains on the edges of the plates 10 and 11 to ensure that a reweld is carried out on the weld metal rather than on the plate material. The cutting step may be commenced before completion of the first weld or it may be made after completion in which case the gap 15 may be set to the required distance for the second weld. This gap 15 is preferably cut out by oxygen cutting or burning, the plates 10 and 11 being held together by strong backs or other similar devices. The gap may be made in two ways; a double cut may be made with the plates firmly held, or a single cut may be made and the two plates moved apart to give the required gap distance. The gap 15 between the remaining portions of first weld 12 is preferably in the order of ¾ of an inch. When a single cut is made and the two plates moved apart for the second weld, it is preferable to set the gap for the first weld at about 1 inch, as the single cut in the first weld and moving apart of the plates does not remove as much material.

A second weld 16 is deposited in the gap 15 between the two portions of first weld 12. The second weld 16 has to be kept to a low heat input to ensure it does not completely melt out the first weld. In a preferred embodiment the second weld 16 has a lower heat input than the first weld as the gap 15 to be filled between the plates is less. The HAZ 13 and 14 of the first weld 12 is normalized by the heating effect from the second weld. The HAZ 17 and 18 of the second weld 16 lies on the weld metal of the first weld 12.

The HAZ 13 and 14 of the first weld 12 is heat treated by the second weld 16 and this heat treatment restores the properties of the material. The HAZ 17 and 18 of the second weld 16 lies in the weld metal from the first weld 12 and the desired mechanical properties of this material may be achieved by correct choice of the weld metal for the first weld 12. Desired properties in the second weld 16 may be achieved by correct choice of weld metal and flux for the second weld 16. Thus, it is possible to achieve excellent properties throughout the weld without any further post-weld heat treatment.

EXAMPLE

Two plates 1½ inches thick of G40.12 steel were set up in spaced apart relationship with a gap between the ends of 1½ inches for vertical welding by means of a consumable nozzle electroslag technique. A first weld was deposited by this technique using ⅛ inch diameter Lincoln L61 electrode wire, through a ⅝ inch diameter Linde coated consumable nozzle. The current was 600 Amps. and the voltage, 37 Volts.

Two cuts were then made in the weld by burning to leave a gap of ⅞ of an inch. A second weld was then deposited in the gap using 3/32 inch diameter Lincoln L61 electrode wire through a ½ inch diameter Linde coated consumable nozzle. The current was 500 Amps. and the voltage, 36 Volts.

Charpy V notch impact tests were carried out on the finished weld samples taken from three different positions: the first position being the HAZ of the first weld; the second position being the HAZ of the second weld; and the third position being in the parent material. The results of these tests are shown in Table 1. As may be seen, good properties are obtained in all of these zones. The HAZ of the first weld has properties that are similar to the parent material.

TABLE 1

| | Impact Properties Cv (ft. lbs.) | | |
|---|---|---|---|
| | Position of Test | | |
| Temp. | HAZ of Weld 1 | HAZ of Weld 2 | Parent Material |
| −40°F | 69 | 21 | 61 |
| −20°F | 116 | 56 | 79 |
| 0 | 101 | 36 | 104 |
| 20°F | 107 | 63 | 105 |
| 40°F | 118 | 79 | 108 |
| 60°F | 117 | 89 | 116 |

Further tests were carried out to compare conventional electroslag welds of A516 steel and G40.12 steel with the method of the present invention. As can be seen from Table 2, the properties of the HAZ of weld 1 for the present method are generally better than the parent plate whereas the properties of the HAZ for the conventional slag weld are generally below the parent plate figures.

TABLE 2

| | | Impact Properties Cv (ft. lbs.) | | |
|---|---|---|---|---|
| | | | Position of Test | |
| | | Temp. | Parent Plate | HAZ |
| Conventional electroslag weld | A516 | −40°F | 14 | — |
| | | −20°F | 21 | 10 |
| | | 0 | 29 | 10 |
| | | 20°F | 33 | 15 |
| | | 40°F | 57 | 13 |

TABLE 2-continued

| | | Impact Properties Cv (ft. lbs.) | | |
|---|---|---|---|---|
| | G40.12 | −40°F | 20 | 15 |
| | | 0 | 35 | 16 |
| | | 65°F | 63 | 46 |
| | | | Position of Test | |
| | | Temp. | Parent Plate | HAZ of Weld 1 |
| Present method | A516 | −40°F | 19 | 28 |
| | | −20°F | 21 | 14 |
| | | 0 | 24 | 35 |
| | | 20°F | 31 | 47 |
| | | 40°F | 32 | 70 |
| | G40.12 | −40°F | 61 | 69 |
| | | −20°F | 79 | 116 |
| | | 0 | 104 | 101 |
| | | 20°F | 105 | 107 |
| | | 40°F | 108 | 118 |

The embodiments of the invention in which an exclusive property or privilege is claimed are defined as follows:

1. A method of butt welding two adjoining plates comprising the steps of first welding the two plates together in a single pass, cutting a gap in the centre of the first weld leaving first weld material on the two adjoining surfaces and rewelding the gap between the two adjoining surfaces of first weld material ensuring the reweld only occurs on the first weld material.

2. The method of butt welding according to claim 1 wherein the rewelding step takes place with a lower heat input weld than the first weld.

3. The method of butt welding according to claim 1 wherein the welding is carried out by an electroslag process.

4. The method of butt welding according to claim 1 wherein the welding is carried out by an electrogas process.

5. The method of butt welding according to claim 1 wherein the welding is carried out using a consumable nozzle electroslag process.

6. The method of butt welding according to claim 1 wherein the cutting step is commenced before the completion of the first welding step.

7. The method of butt welding according to claim 1 wherein the cutting step is carried out by oxygen cutting or burning.

8. The method of butt welding according to claim 1 wherein the two plates are firmly held together during the cutting step.

9. The method of butt welding according to claim 1 wherein the two plates are spaced approximately 1 inch apart for the first weld and wherein a single cut is made in the centre of the first weld and the two plates are moved apart to give a gap of approximately ¾ of an inch wide before commencing the rewelding step.

10. The method of butt welding according to claim 1 wherein the two plates are spaced approximately 1½ inches apart for the first weld and wherein two cuts are made in the first weld to leave a gap approximately ¾ of an inch wide before commencing the rewelding step.

* * * * *